United States Patent Office 3,563,972
Patented Feb. 16, 1971

3,563,972
LOW MELT ELASTICITY COMPOSITION
OF POLYPROPYLENE
Ronald C. Kowalski, Baytown, Tex., assignor to Esso
Research and Engineering Company
No Drawing. Continuation of application Ser. No.
579,501, Sept. 15, 1966. This application Oct. 15,
1969, Ser. No. 866,769
Int. Cl. C08f 3/08
U.S. Cl. 260—93.7                                    2 Claims

ABSTRACT OF THE DISCLOSURE

A method for producing a polypropylene composition having a melt elasticity (swell) value between 1.5 and 3.0 comprises contacting the polypropylene with oxygen, heating the polypropylene in the feed-end of an extruder-reactor at temperatures between 600° and 1,000° F. and then cooling the polypropylene to a melt temperature not in excess of 600° F. A polypropylene composition having a melt elasticity (swell) of less than 3.0 has a molecular weight distribution which is very narrow as compared to commercial polypropylene compositions.

This application is a continuation of S.N. 579,501, filed Sept. 15, 1966, now abandoned.

The present invention is directed to new and useful compositions of polypropylene. More specifically, the invention is directed to compositions of polypropylene having a narrow molecular weight distribution which is characterized by an extremely low level of melt elasticity (swell). In its more specific aspects, the compositions of polypropylene are produced by the use of an extruder-reactor wherein polypropylene which has been made by the usual methods is heated in the presence of oxygen through a controlled temperature profile and extruded to the desired weight average molecular weight and molecular weight distribution.

The polymerization of propylene with a Ziegler-type catalyst, for example titanium trichlororide and triethylaluminum, to produce polypropylene is well known. A particularly suitable catalyst and processes for producing polypropylene is disclosed in U.S. 3,032,510. The known processes for making polypropylene may use chain terminators or transfer agents such as hydrogen to control molecular weight. However, the use of such expedients as chain terminators does not control molecular weight distribution of the polypropylene made and the molecular weight distribution ($\bar{M}_w/\bar{M}_n$) of such processes is above 4.5 and is usually at the upper end of a range between 4.5 to 8.5 higher.

It has been found that the processing of polypropylene made according to the usual methods is difficult since high temperatures, low throughputs, and special procedures are often required. According to the present invention, however the molecular weight distribution of polypropylene can be controlled so that at any level of melt viscosity, the polypropylene will have an extremely low level of melt elasticity. This low level of melt elasticity makes the polypropylene particularly suitable for processing such as for melt spinning of fibers or the production of film. The unique composition of polypropylene of this invention makes it possible to spin fibers which are almost entirely unstrained immediately after being extruded. The lack of strain in the melt state, contrasted to previously available polypropylene, eliminates the cause of many fiber breakages, and also permits a much higher level of elongation in a subsequent cold drawing operation, resulting in significantly higher levels of tenacity in the finished product. Another unique advantage resulting from the low elasticity level of the polypropylene compositions of the present invention is that they can be extruded at a temperature 100° F. or more below the extrusion temperature normally required in the melt spinning of polypropylene of the same viscosity level.

It is therefore an object of the present invention to produce compositions of polypropylene which have a desired molecular weight distribution as well as a desired molecular weight.

Another object is a polypropylene composition having improved processing characteristics due to its low level of swell of less than 3.0.

Another object of this invention is to provide a method of producing a polypropylene composition having a low melt elasticity value by utilizing an extruder-reactor.

Still another object is a polypropylene composition having a swell between 1.7 and 2.6 at viscosity levels in the range of 16 to 19 shear stress units, p.s.i.

Other objects and aspects of the present invention are to be found in the following description, examples, and claims.

The compositions of polypropylene of the present invention are made by using an extruder-reactor. The extruder-reactor used according to the present invention is preferably a single screw extruder which has a positive mixing zone at the feed port for introducing with the unmelted pellets or polypropylene powder an oxygen-containing gas. Also additional heaters and heater controls may be necesary to provide the proper temperature control in the reaction zone of the extruder. The thus modified extruder, referred to herein as an extruder-reactor, is considered to have three zones, (1) mixing, (2) reactor, and (3) metering. Polypropylene made by conventional methods and having a molecular weight distribution ($\bar{M}_w/\bar{M}_n$) of greater than 4.5 is introduced to the extruder-reactor with an oxygen-containing gas. The pellets or polypropylene powder need only to pass through a gas having at least 7 mol percent oxygen. Air is preferred although pure oxygen cut back with an inert gas ($N_2$, $CO_2$, etc.) for safety reasons may be employed. The polypropylene in the presence of the oxygen-containing gas is passed to the reaction zone wherein the polypropylene is heated to a controlled melt temperature within the range of 550° to 900° F. After heating and the melting of the polypropylene, the polypropylene is pumped out of the die. The polypropylene composition thus formed by the present invention may be extruded from the extruder-reactor as a strand which is thereafter cooled and pelletized or some other suitable means may handle the polypropylene such as an underwater pelletizer.

Thus the extrusion process is considered to progress through three zones, (1) the mixing zone wherein the solid polypropylene pellets or powder are transported through the surrounding oxygen-containing gas, (2) a reaction zone wherein the polypropylene is converted to liquid and maintained under shear and high temperature conditions in the presence of the oxygen-containing gas, and (3) the metering zone, which occupies most of the extruder, wherein the liquid polypropylene is pumped at reduced temperatures to the die. Since the oxygen-containing gas can remain in contact with the polypropylene only up to the reaction zone wherein the polypropylene becomes liquid and wherein the oxidative reaction will most likely occur when the oxygen-containing gas and polypropylene are in contact under shear and high temperature, it is the mean temperature in the reaction zone which primarily controls the total extent of degradation of the polypropylene introduced to the extrusion process. The extent of the degradation in the extrusion process of the present invention is substantial and amounts to a reduction of shear stress to 70 percent or less of the shear stress of the polypropylene introduced to the extruder-reactor. However, the degradation which occurs is controllable by the temperature employed in the reaction zone so that not only is the molecular weight reduced in the extrusion process but the molecular weight distribution is made narrower. By the foregoing, it has been emphasized that the extruder-reactor of the present invention has three zones and the control of the degradation is in the reaction zone. It is further pointed out that the temperature of the extruder-reactor at the feed-end from one-third to one-half the length of the extruder-reactor is maintained at the extremely high and controlled temperature. The remaining half or two-thirds of the extruder-reactor requires a small amount of cooling capacity. Thus, the temperature profile of the polypropylene as it passes through the extruder-reactor is very different from the temperature profile of materials which are passed through extruders in the normal operation. The normal profile of temperature of material in an extruder is a curve starting at the temperature of the material at its introduction and approaching the melt temperature at the die. This is the result of having the temperature of the metal of an extruder fairly uniform throughout the device. It is unique to the present invention that the polypropylene is heated in the reaction zone to temperatures above any known used in extrusion processes heretofore although the temperature of the polypropylene removed from the die may not be much greater than temperatures which have been used.

By the extrusion process of the present invention polypropylene compositions having melt elasticity values or swell between 1.7 and 2.6 (0.1 sec.) at viscosity levels in the range of 14 to 19 (0.1 sec.) shear stress units, p.s.i., have been obtained. No physical effect on the solid state properties of the polypropylene was found to result from the narrowing of the molecular weight distribution which occurs during the process of the present invention. The analysis of the polypropylene compositions of the present invention indicates that there is an uptake in oxygen in the order of magnitude of 100 p.p.m.; however, it appears that this amount does not affect any physical properties of the polypropylene. X-ray crystallinity data showed no effect on moderate or extreme degradation on polymer crystallinity. No change was found in the melting properties of the polypropylene compositions produced according to the present invention. In summary, the unique property of the polypropylene of the present invention is the extremely low melt elasticity (swell) value of below 3.0 and within the range of 1.7 and 2.6.

For the purpose of describing the present invention and defining in numerical ranges the properties of the polypropylene of the present invention, the terms melt elasticity or swell and shear stress have been used. Although it has not been so stated in each instance, the numerical values are at 0.1 sec. (die residence time) as measured in a rheological instrument having a capillary die of a nominal length of 1.0" and a length to diameter ratio of 16. A rheological instrument having these characteristics is fully described in U.S. 3,279,240. The capillary die had a 0.06" diameter and was 1.0" long. The geometry of the instrument is such that a 0.1 sec. residence time is equivalent to a shear rate of 1300 sec.$^{-1}$. The information obtained from a rheological instrument such as described in U.S. 3,279,240 is pressure, flow rate, and diameter of the solidified polymer extrudate. From these measurements and the geometry of the capillary die and the molten polymer density, shear stress ($\tau$) shear rate ($\dot{\gamma}$), and swell $(d/d_o)_c^2$ are calculated.

The relationship between shear stress and shear rate is given by Newton's law of viscosity:

$$\tau = \eta_a \dot{\gamma}$$

where:

$\eta_a$ = "apparent" viscosity
$\tau = (\Delta P) R/2L$
$\dot{\gamma} = 4Q/\pi R^3$
$\Delta P$ = pressure drop, p.s.i.
R = die radius, inches
L = lie length, inches
Q = volumetric flow rate, in.$^3$/sec.

The swell-shear stress relationship is given by the following equation:

$$(d/d_o)_c^2 = K\tau + 1$$

where:

d = extrudate diameter, inches
$d_o$ = die diameter, inches
c = correction for densification on cooling
K = constant, function of molecular parameters This latter equation is described in more detail in "Molten Polymer Elasticity," Ph.D. Thesis of R. C. Kowalski, Polytechnic Institute of Brooklyn, June 1963. From the calculations, the viscosity data is plotted in terms of shear stress and shear rate and the elasticity data is plotted in terms of swell and shear stress. The use of the residence time of 0.1 sec. in a particular capillary die or a shear rate of 1300 sec.$^{-1}$ is to enable shear stress and swell to be used as parameters under a common condition such that two compositions of polypropylene can be identified by numerical values rather than by families of curves. Thus, shear stress at 0.1 sec. is nothing more than the shear stress of a polypropylene sample at a shear rate of 1300 sec.$^{-1}$ or the residence time of 0.1 sec. in a capillary die having an L/D ratio of 16 and a nominal length of 1". A swell at 0.1 sec. is the swell of a sample at the shear stress corresponding to a shear rate of 1300 sec.$^{-1}$ or a residence time of 0.1 sec. in the rheological instrument described above. By the relationship of shear stress and swell at a selected shear rate, polypropylene can be characterized so as to determine the relationship of molecular weight (corresponding to shear stress) and molecular weight distribution (corresponding to swell).

The present invention will be further illustrated by the following specific examples which are given by way of illustration and not as limitations on the scope of the invention.

EXAMPLE 1

Into a single screw extruder was fed a polypropylene powder having a melt flow rate (MFR) of 4 which had never contacted air. The powder was fed by means of an inert gas system and the extruder hopper had a $N_2$ purge. The temperature of the extruder was stabilized at 565° F. and the temperature was gradually raised to about 600° F. The melt flow rate of the extruded polypropylene was measured and remained below 5.0. The $N_2$ purge was then shut off and air was allowed to enter the hopper. As the gas space became replaced with air (about ½ of the hopper) the following data where taken, with no changes in extruder conditions:

| Time of sample: | Melt flow rate |
|---|---|
| 13:00 | 7.5 |
| 13:15 | 8.3 |
| 13:35 | 9.7 |
| 13:57 | 10.6 |

These data show that no substantial degradation occurred until the oxygen content in the hopper increased. Further, these data indicate that substantial degradation occurs with very small amounts of oxygen present, the molar percent of oxygen present in the gas phase being at least 7 mol percent.

To illustrate the importance of the temperature profile and the operation of the extruder-reactor of the present invention, a normal extrusion run (a) is compared to a run (b) of the present invention.

EXAMPLES 2 AND 3

| | Zone temperature, ° F., | | | | | Degradation ratio [1] | Swell |
|---|---|---|---|---|---|---|---|
| | Zone number | | | | | | |
| | 1 | 2 | 3 | Die | Stock | | |
| Run: | | | | | | | |
| a | 550 | 550 | 597 | 600 | 600 | 0.74 | 3.7 |
| b | 750 | 750 | 500 | 490 | 550–560 | 0.56 | 2.2 |

[1] Ratio of shear stress of extruded product to shear stress of beginning material.

The temperatures given in the foregoing examples are the metal temperatures of the extruder-reactor except the stock temperatures. The metal temperatures in the mixing and reaction zone can vary between 600° and 1,000° F. From the examples, it is evident that by using the temperature profile of the present invention a greater degradation ratio can be achieved and a lower swell. Further, it is pointed out that a stock temperature of 600° F. is about as high a stock temperature which can practically be used. The strength of any strand and the amount of cooling necessary for a stock above 600° F. is such that strand cooling equipment has been found to be marginal at 620° F. The use of very high temperatures in the feed-end of the extruder-reactor while using no heat and sometimes cooling in the mixing zone is considered a part of the unique extrusion process of the present invention.

The shear stress of the feed in run (b) was 29.7 and was reduced to a 16.6 product. The produce compositions of the present invention, the shear stress of the feed must exceed about 25.0.

The nature and objects of the present invention having been completely described and illustrated, what I wish to claim as new and useful and secure by Letters Patent is:

1. A method for producing a polypropylene composition having a melt elasticity (swell) of less than 3.0 by passing polypropylene having a swell above 4 and a shear stress at 0.1 sec. above 25 through an extruder-reactor which comprises contacting said polypropylene with an oxygen-containing gas having at least 7 mol percent oxygen, heating said polypropylene by maintaining the extruder-reactor at temperatures in the feed-end within the range of 600° to 1,000° F. and then cooling said polypropylene so that the melt temperature at the die does not exceed 600° F.

2. A method according to claim 1 wherein the temperature in the feed-end is maintained at about 750° F. and the temperature of polypropylene at the die is about 550° to 560° F.

References Cited

UNITED STATES PATENTS 3,144,436    8/1964    Greene et al. _____ 260—93.7

JOSEPH L. SCHOFER, Primary Examiner

R. A. GAITHER, Assistant Examiner

U.S. Cl. X.R.

260—94.9G